INVENTORS
ROBERT H. HERRING
LOUIS L. NEUBAUER
BY Strauch, Nolan & Diggins
ATTORNEYS

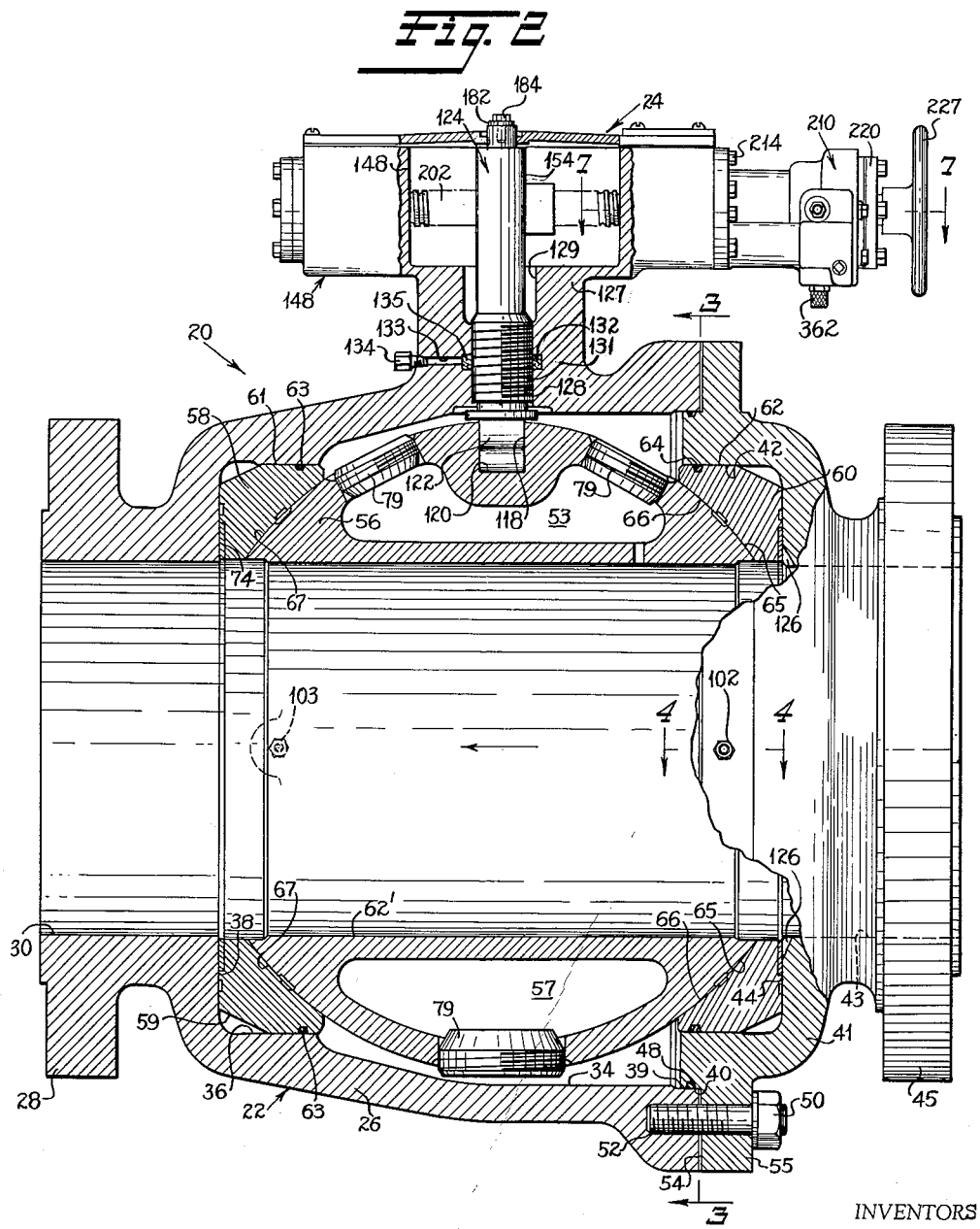

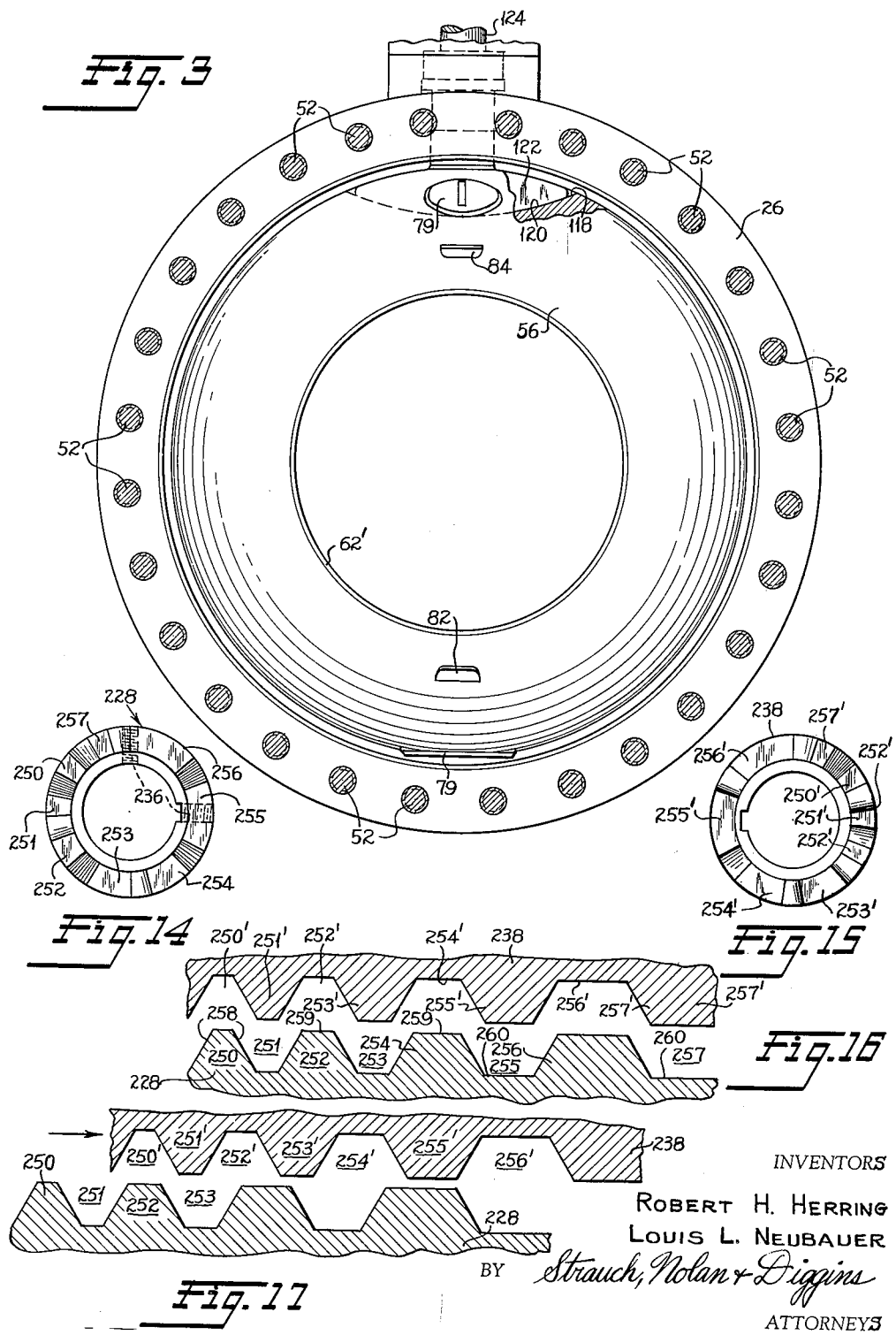

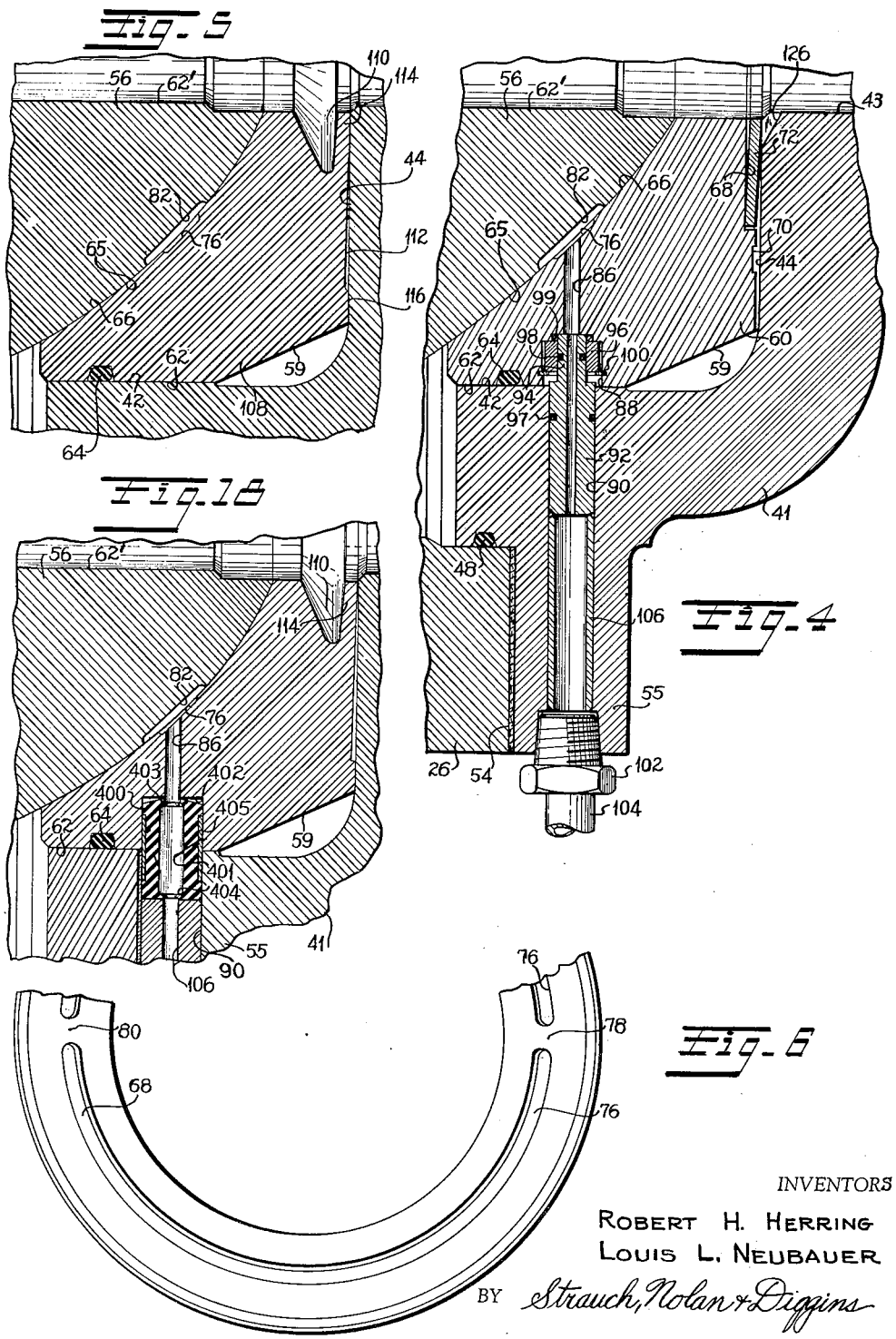

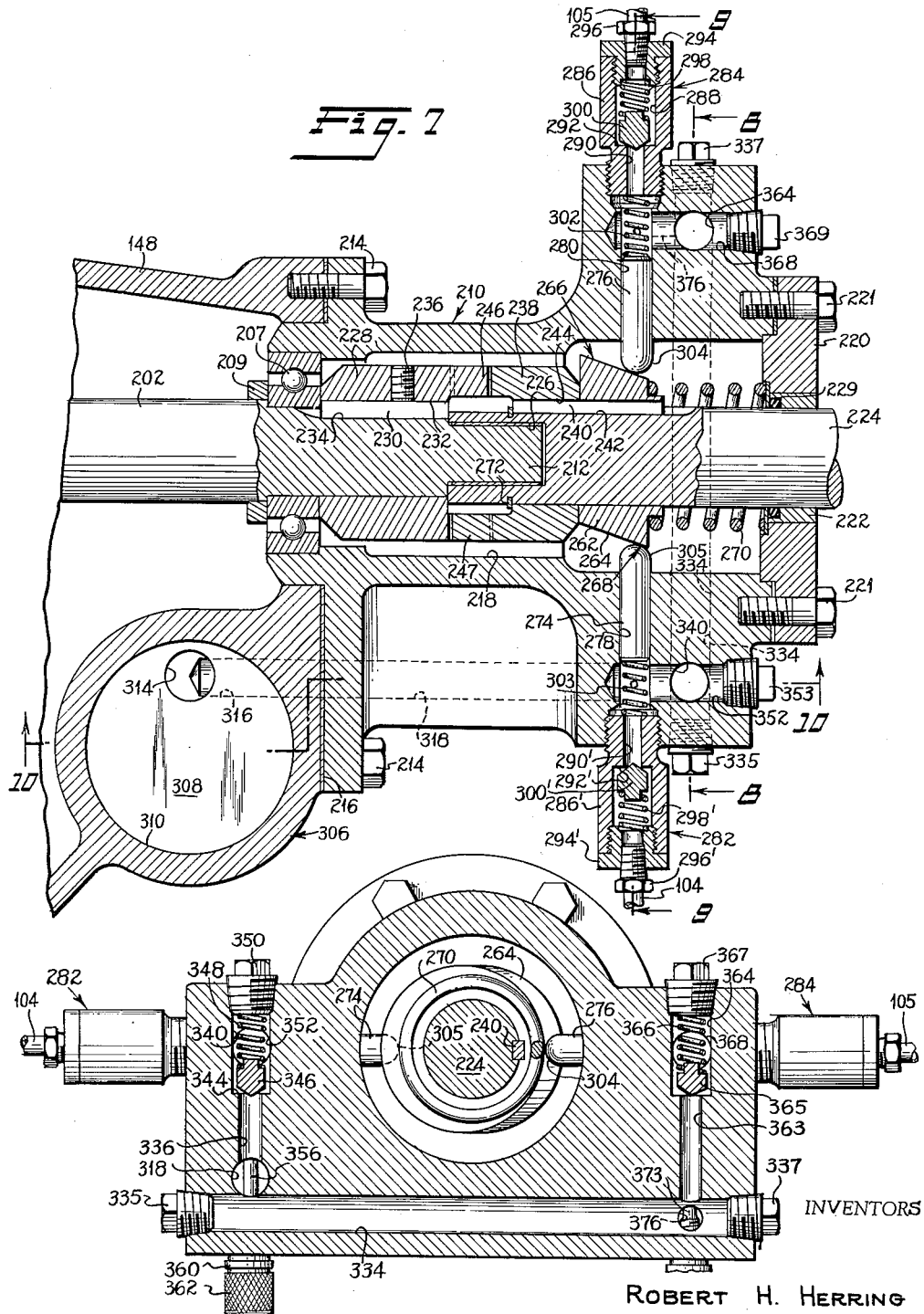

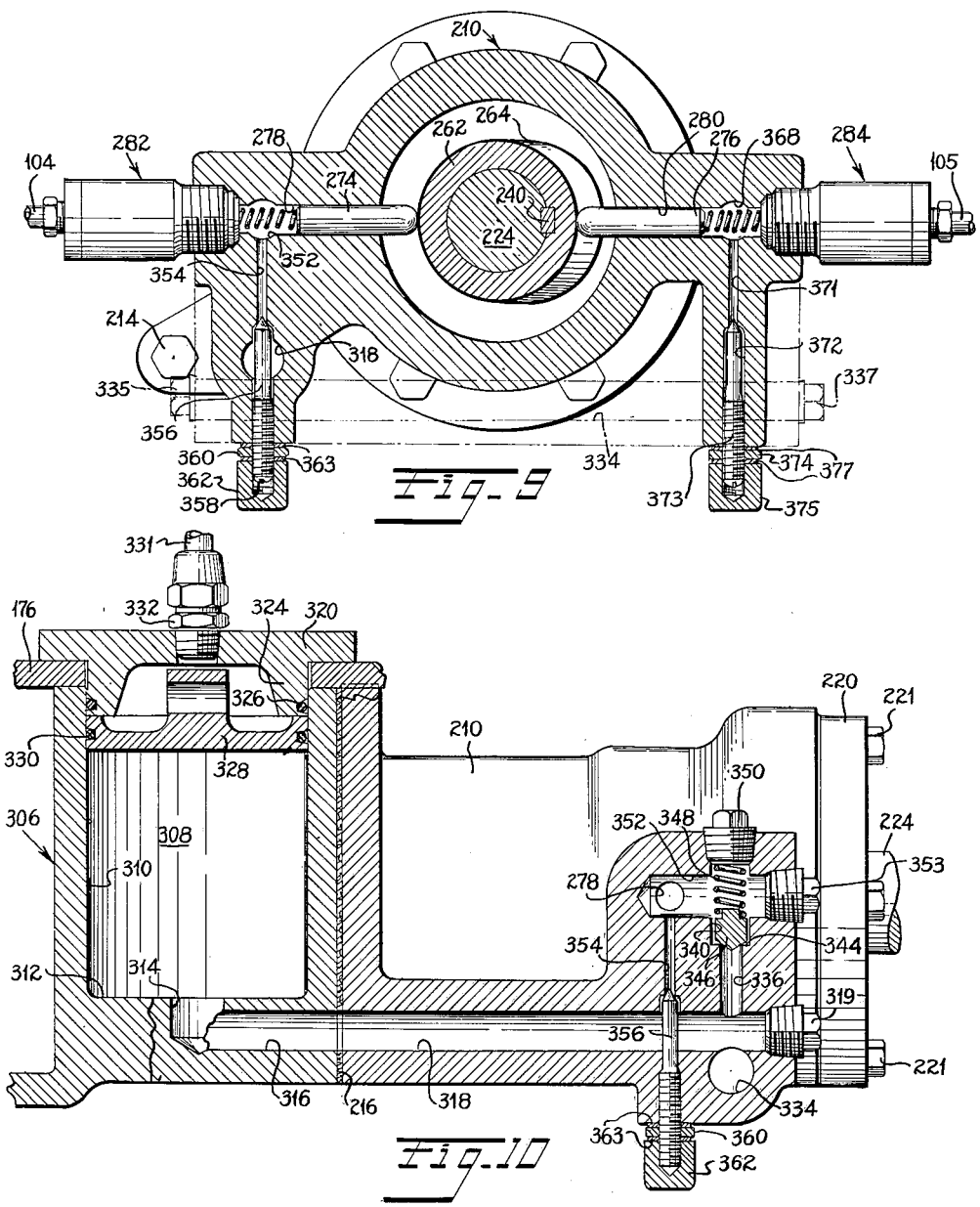

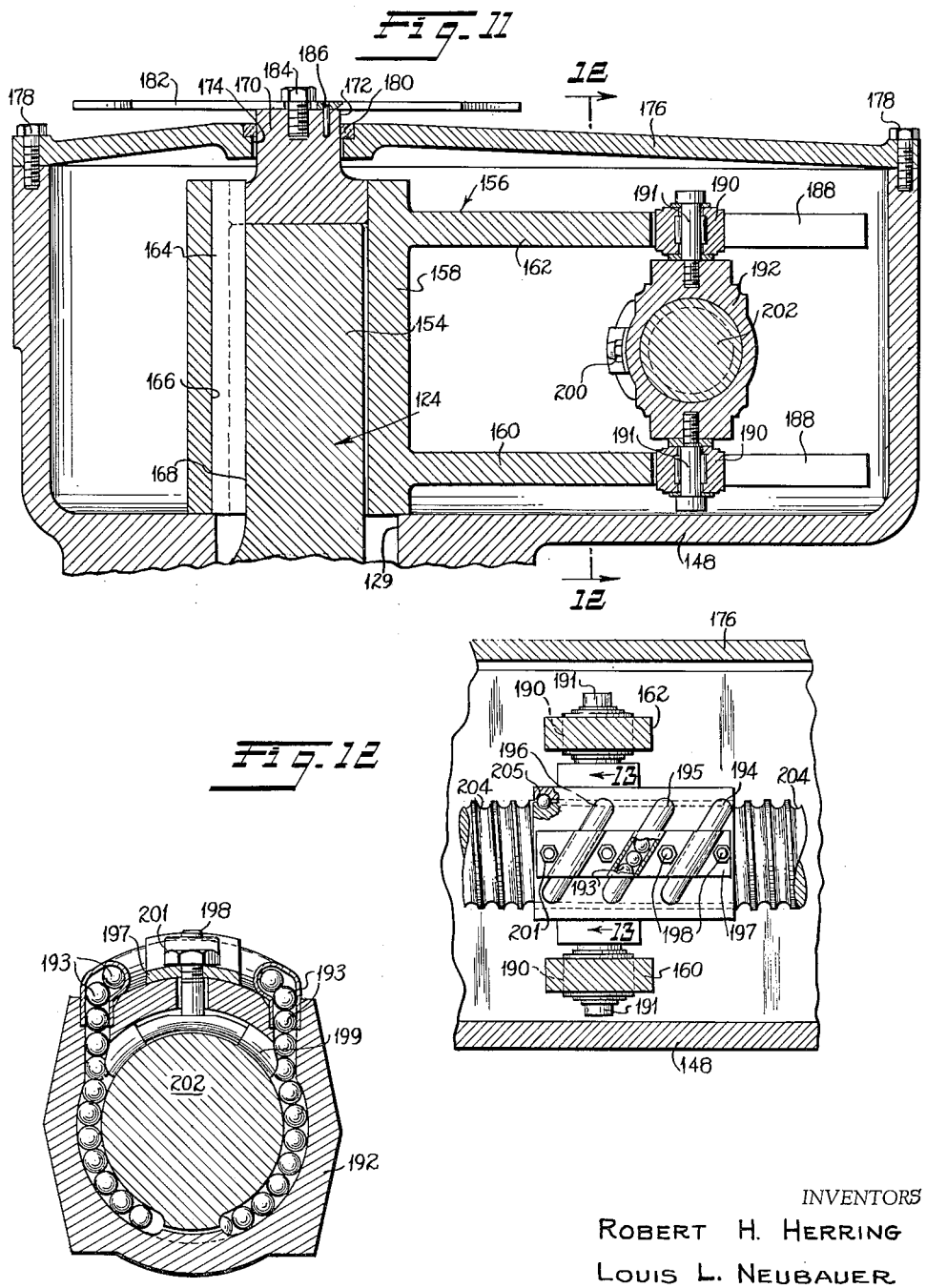

United States Patent Office 2,979,071
Patented Apr. 11, 1961

2,979,071

LUBRICATED BALL VALVE

Robert H. Herring, Sulphur Springs, Tex., and Louis L. Neubauer, San Francisco, Calif., assignors to Rockwell Manufacturing Company, Pittsburgh, Pa., a corporation of Pennsylvania Filed Sept. 11, 1953, Ser. No. 379,496

5 Claims. (Cl. 137—246.13)

This invention pertains to ball valves and operating devices therefor and more particularly to ball valve structures which include special ball turning and seating arrangements and automatic means for supplying lubricant under pressure to free the ball in the event that it becomes stuck or "frozen" to its seats.

The invention will be described in its preferred embodiment as applied to ball valves but it will be understood by those skilled in the art that certain aspects may be applied with equal advantage to various other types of plug valves.

This is an improvement over the ball valve assembly disclosed in the copending application of Gorge F. Scherer, Serial No. 283,879, filed April 23, 1952, now Patent No. 2,788,015, granted April 9, 1957, wherein lubricant is supplied to grooves in axially floating seating rings by conduits through the walls of the valve body, and wherein the lubricant may be placed under pressure by means of a lubricant screw threaded into a lubricant reservoir passage when it is desired to jack the ball plug from its seat.

In such arrangements, however, the lubricant reservoirs are of small capacity and may require frequent refilling. Moreover, the process of opening or closing a "frozen" valve usually involves the alternate manipulation of the hand wheel or whatever device is provided for rotating the ball plug and periodic turning of the lubricant screw until a high enough jacking pressure is achieved to loosen the valve plug sufficiently to be turned to the desired position. The automatically operated lubricating system of the invention simplifies that operation.

The present invention contemplates an improved lightweight ball valve assembly particularly suitable for use in high pressure, large diameter pipe line service wherein a novel actuating linkage transmits improved turning effort to the valve plug stem to open or close the valve, and wherein a lubricant pump automatically provides high pressure lubricant for lubricating and jacking the plug from its seat in accordance with resistance to turning of the plug.

It is the major object of this invention to provide a generally improved lubricated ball valve assembly.

It is a further object of the invention to provide a novel lubricant pump or equivalent for automatically supplying lubricant under pressure to the valve seats during opening or closing of the valve and for automatically increasing the lubricant pressure when necessary for jacking the valve ball from its seat in open, closed, or any intermediate position.

It is a further object of the invention to provide an improved ball valve assembly for large pipe line and other high pressure service having a cored valve ball plug which reduces the weight of the assembly.

It is another object of the invention to provide improved lubricataed ball valve seats which efficiently allow jacking of the valve ball and yet allow tight shut off against leakage of line fluids.

It is still another object of the invention to provide a novel plug valve operating linkage for transmitting turning effort to the plug which lessens the turning effort required.

It is a further object of the invention to provide a novel operating linkage for plug valves which automatically becomes inoperative when the valve reaches full open or full closed limit position.

A further object of the invention is to provide a novel worm and ball bearing nut device for turning a valve plug.

It is a further object of the invention to provide a novel ball valve seat ring construction.

Another object of the invention is to provide in a lubricated ball valve assembly a novel flexible conduit arrangement for introducing lubricant into and through the axially floating seat rings.

It is a further object of the invention to provide a plug valve assembly wherein the operating device for rotating the valve stem also actuates automatically a novel pump and lubricant passage system when the turning effort on the plug exceeds a predetermined amount.

Other objects of the invention will become apparent from the following description and subjoined claims in conjunction with the annexed drawings in which:

Figure 2 is a longitudinal vertical section through the valve and actuator assembly taken on line 2—2 of Figure 1 with some parts shown in elevation;

Figure 3 is an end view of the ball plug as viewed from line 3—3 of Figure 2 and partly broken away and sectioned to show the stem tang in its groove in the plug;

Figure 4 is a fragmentary enlarged sectional view of a seat ring and adjacent valve structure taken substantially on line 4—4 of Figure 2;

Figure 5 is a view similar to Figure 4 but showing a modified form of seat rings;

Figure 6 is a fragmentary elevational view of the ball seating face of the seat rings of either Figure 4 or Figure 5;

Figure 7 is an enlarged fragmentary section taken substantially on line 7—7 of Figure 2 showing the automatic lubricant pump and valved conduit system;

Figure 8 is an enlarged fragmentary section taken on line 8—8 of Figure 7 showing details of the lubricant passages;

Figure 9 is an enlarged fragmentary section taken on line 9—9 of Figure 7 showing further details of the lubricant passages and valves;

Figure 10 is an enlarged fragmentary section taken on line 10—10 of Figure 7 showing details of the lubricant reservoir and passages;

Figure 11 is an enlarged fragmentary section taken on line 11—11 of Figure 1 showing the ball bearing nut to valve stem connection details;

Figure 12 is a section taken on line 12—12 of Figure 11 and showing details of the ball bearing nut;

Figure 13 is an enlarged section on line 13—13 of Figure 12 illustrating a ball bearing circuit;

Figures 14 and 15 are end elevational views of the engaging faces of the pump shaft clutch elements;

Figure 16 is a developed view of the teeth of the clutch elements arranged in proper relative angular position for engagement; and Figure 17 is a view similar to Figure 16 showing the clutch elements moved to a non-engaging position; and Figure 18 is a fragmentary enlarged sectional view similar to Figure 4 showing a modified form of lubricant supply passage.

Figure 1:
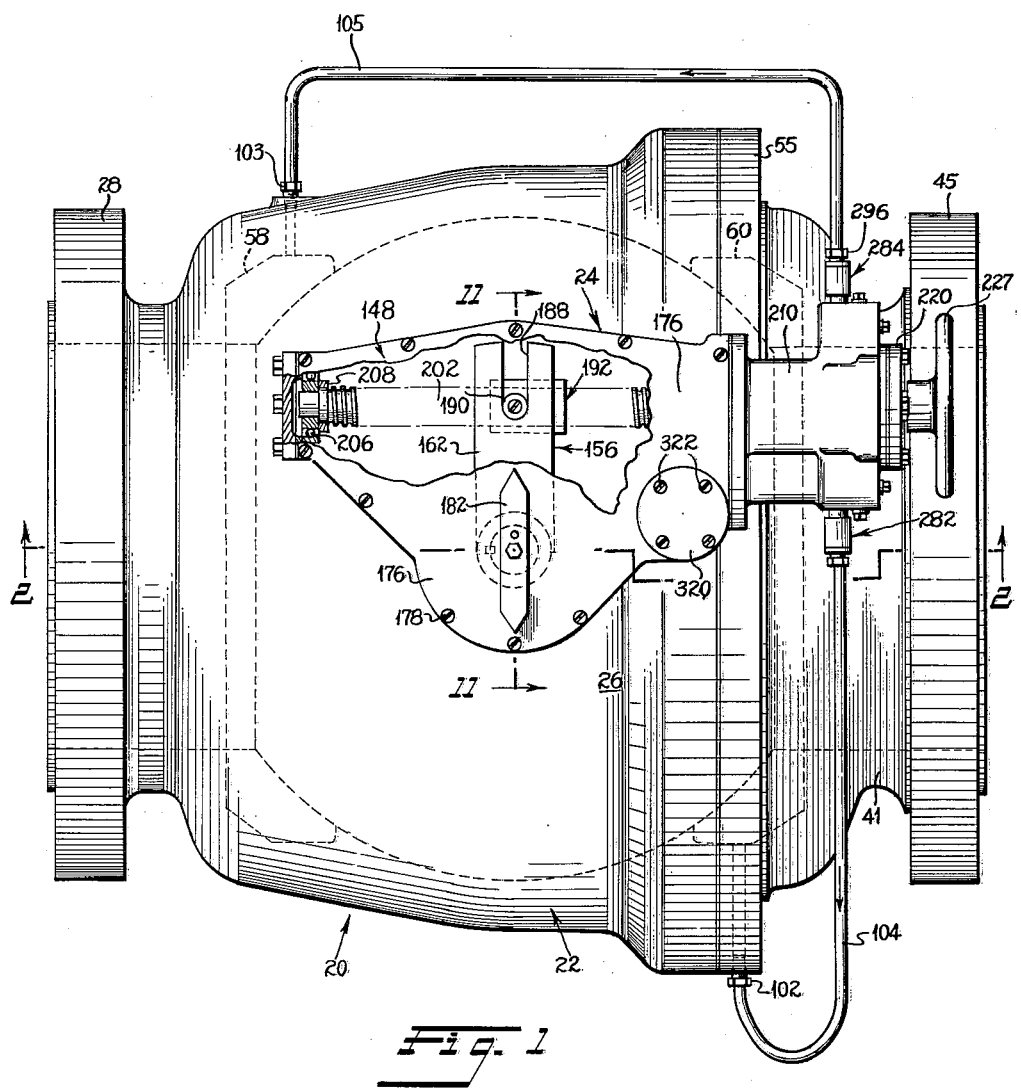
Figure 1 is a top plan view of the entire valve and actuator assembly with a portion of the actuator assembly housing broken away to show parts of the plug operating linkage.

Referring to the drawings and particularly to Figures 1 and 2, the ball valve assembly indicated generally as 20 comprises two main sub-assembly units; a ball valve proper 22, and an actuating and lubricating device 24.

The ball valve proper, as shown in Figure 2, comprises a tubular main housing member 26 having one end provided with a line attachment flange 28 through which there is a fluid flow passage 30. Housing 26 is provided with an interior bore 34 that is larger in diameter than passage 30 and formed adjacent passage 30 with a cylindrical surface 36 and a flat radial seat ring backing surface 38. At its open end housing 26 is provided with an internal cylindrical surface 39 in which is piloted the external cylindrical surface 40 of tail piece 41.

Housing tail piece 41 is likewise formed with an internal cylindrical surface 42 of the same size as surface 36, a fluid flow passage 43 coaxial with and of the same size as passage 30, a flat radial seat ring backing surface 44 and a line attachment flange 45. In addition, the tail piece is grooved to receive a rubber O-ring 48 which is compressed between tail piece 41 and surface 40 when the two parts of the housing are assembled, to seal against leakage. Tail piece 41 is detachably secured to the main housing as by nuts 50 threaded on studs 52 and a suitable spacer 54 is interposed between the opposed end faces of the housing and radial flange 55 of the tail piece.

This spacer is used to control the assembly of the ball seats, housing, and tail piece, and may be omitted by machining the bearing face 44 of tail piece 41 to the proper depth after the amount of stock removal necessary for proper "fit-up" had been determined by a preliminary assembly. The procedure used is as follows:

The body is placed on its flanged end 28 and seats 58 and 60 together with the ball 56 placed therein in the proper sequence after which the semi-finished tail piece 41 is positioned and drawn up with a torque of 300 foot pounds on each of the body stud nuts 50, using the standard criss-cross method of tightening pressure heads, etc. Tail piece 41 having been machined deliberately with the bearing face 44 at too shallow a depth below the face of flange 55 which abuts the joint face of body 26, this preliminary assembly causes a gap shown in Figure 2 as filled by spacer 54. The average width of this gap is measured by feeler gages or the like and the bearing face 44 of the tail piece 41 refaced to a greater depth to obtain the proper preload deflection of the elastically backed seat rings 58 and 60 or rings 108 hereinafter described.

A substantially spherical ball plug 56 is rotatably disposed within the valve housing on a pair of annular seat rings 58 and 60. The plug is cored or hollowed out at the top and bottom as shown at 53 and 57, Figure 2, in order to reduce the weight thereof. In the present embodiment a cast ball is used and the openings left by the core prints used in the formation of cavities 53 and 57 may be closed by plugs 79.

Plug 56 contains a diametral passage 62' adapted to register with bores 30 and 43 when the plug is in the full open position of Figure 2. The plug may be rotated 90° about its vertical axis to close the valve as by means of linkage hereinafter described.

Still referring to Figure 2, rigid metal seat rings 58 and 60 are axially slidably mounted on the cylindrical surfaces 36 and 42 respectively in the housing assembly, and their external cylindrical surfaces 61 and 62 are grooved to receive suitable sealing means such as compressible rubber O-rings 63 and 64 disposed between the telescoped cylindrical surfaces. Inasmuch as the seat rings are preferably identical so as to be interchangeable, only one will be described in detail. Each seat ring has its outer corner cut away at 59.

Referring to Figure 4, the tail piece seat ring 60 is formed with a ground spherical surface 66 conforming closely to the curvature of the opposed spherical zones 65 and 67 of plug 56. The back surface of ring 60 is provided with an annular recess 68 and an annular groove 70. The annular recess 68 seats an annular compression spring 72 preferably of the type known as a Belleville spring which reacts against surface 44 of the tail piece to resiliently bias the seat ring 60 into surface contact with the plug. Seat ring 58 is similarly resiliently biased against the plug 56 by compression spring 74 reacting against surface 38 of the main housing. The Belleville spring used in the invention was continuous ring of shallow arcuate cross section which would deform flat under sufficient compression but rings of conical or similar cross sections may be used.

Referring to Figure 6, each seat ring is provided with a shallow lubricant groove 76 of substantially uniform depth interrupted by diametrically spaced narrow lands 78 and 80. The surface of plug 56 is formed with pairs of upper and lower short grooves only two of which are shown at 82 and 84 in the end view of Figure 3. There are four pairs of these grooves spaced 90° apart with respect to the axis of rotation of ball 56, and this insures that opposed 180° spaced pairs of the grooves will bridge lands 78 and 80 in the fully open and closed positions of the valve, which positions are located 90° apart as previously mentioned. When the lands are so bridged by the short grooves, grooves 76 become effectively continuous about the ball on opposite sides thereof.

Grooves 76 are adapted to receive a plastic lubricating and sealing material which is furnished under pressure by means of a pump system hereinafter to be described and is introduced into the grooves in the following manner.

As shown in Figure 4, tail piece seat ring 60 is provided with a radial duct 86 communicating at its inner end with groove 76 and at the opposite end with an enlarged counterbore 88.

A bore 90 extends radially through flange 55 in substantially coaxial alignment with bores 86 and 88 when the valve is assembled and contains a tubular insert 92 having a reduced neck 94 projection into counterbore 88 where it is encircled by a collet 96 disposed in and having a sufficiently smaller diameter than the counterbore as to allow a substantial amount of lateral movement therein. Sealing means such as rubber O-rings 97, 98 and 99 are provided to seal the insert in bore 90, neck 94 in collet 96 and the collet in the bottom of counterbore 88. The collet is axially retained in counterbore 88 by a snap ring 100 in a suitable groove in the wall of the counterbore. The outer end of bore 90 is enlarged and threaded to receive a standard fitting 102 for attaching a lubricant supply line 104, a spacer sleeve 106 being provided in the bore between the fitting and the tubular insert in order to maintain the latter in position. This structure provides a means for supplying lubricating and sealing material to the grooves 76 without leakage because the clearance around the collet 96 permits the slight axial displacement of the seat rings relative to the insert 92 that takes place during operation of the valve as the seat rings float.

As shown in Figures 1 and 2, the same lubricant conducting structure just described in conjunction with tail piece seat ring 60 is also provided for seat ring 58 in the main housing and is supplied by lubricant line 105 secured by fitting 103. However, bore 90, which in the tail piece seat must traverse the flange 55, is much shorter in the main housing where it is only necessary to penetrate the wall thickness of the housing. In the interest of maintaining maximum interchangeability of parts, tubular insert 92 is made of the correct length for traversing the main housing wall thickness and the spacer sleeve 106 is omitted from the corresponding bore in the main housing.

A modified form of seat ring is shown in Figure 5 and designated by reference numeral 108, which form eliminates the need for a separate spring 72. To this end, the seat ring 108 is deeply relieved around its entire internal periphery as at 110 and around its back face as at 112 so as to form an integral continuous annular resilient lip 114 which abuts against surface 44, as the case may be, or surface 38 of Figure 1 depending on whether it is installed in the main housing or the tail piece. Surface 44 is normal to the valve axis. In the relaxed condition of the ring 108, lip 114 is inclined slightly rearwardly with respect to a plane perpendicular to the axis of ring 108, so that lip 114 functions as a compression spring in the assembly, bending toward the surface of ball 56 under compression. The relieved portion 112 on the face of seat ring lies in a plane slightly inclined from the perpendicular to the axis of the seat ring and is terminated abruptly to provide a solid flat abutment surface 116 which serves to limit the deformation of lip 114 and therefore the amount which the seat ring can be displaced toward surface 44.

It will be understood that the modified seat ring shown in Figure 5 and its counterpart in the main housing are provided with lubricant conducting structure identical to that described hereinabove in conjunction with the seat rings 58 and 60.

As best shown in Figures 2 and 3, the upper surface of plug 56 contains a straight sided slot 118 having an arcuate bottom wall 120 and adapted to receive a straight sided tang 122 fixed to the lower end of a rotatable valve stem 124, which tang has a lower surface conforming to the bottom wall of the slot. The bottom wall 120 may also be a chordal surface perpendicular to a diameter of the plug which coincides with the axis of the plug stem. This construction reduces manufacturing costs without sacrifice of the advantages of the arcuate slot.

The slot 118 is arranged at right angles with respect to the axis of passage 62 so that when the plug has been rotated to closed position, the axis of slot 118 is parallel to the flow path through the valve and thus line pressure acting on the upstream face of the plug displaces the plug axially of the valve and against the downstream seat ring to improve the sealing contact therewith in direct proportion to line pressure. Sufficient clearance is provided between the tang and slot to permit shift of the plug toward one seat or the other in operation. At the same time, the upstream seat ring will be urged against the upstream face of the ball by the action of the associated Belleville spring or integral spring portion resulting in a double peripheral seal between the seat rings and the ball. Also when the spring displaces the upstream seat toward the ball, line pressure will enter the space behind the upstream seat and urge it against the ball. It will be noted that this compound sealing effect is achieved for both directions of flow through the valve.

Referring to Figure 4, it will be seen that a diagonal notch 126 may be formed extending from bore 43 to surface 44. Any reasonable number of such notches may be circumferentially spaced around surface 44 and they act to admit the upstream line pressure to the space between spring 72 and the O-ring seal at 64, which pressure supplements the effect of the compression springs and improves the sealing relation between the associated plug surface and seat ring. Notches 126 also provide for insertion of a tool to remove ring 60 from the body.

The top of the main housing 26 is formed with a boss 127 which is integral with the drive gear housing 148 of actuating device 24. Internally boss 127 has a threaded bore section 128 and a larger bore section 129 opening into the interior of housing 148.

Valve stem 124 is formed above the tang 122 with a threaded section 131 rotatable in threaded bore section 128. As illustrated in Figure 2, threaded bore 128 is formed with an annular recess 132 connected by radial port 133 to a lubricant gun fitting 134. A ring of compressible packing material 135 is provided in recess 132, and when lubricant under pressure is introduced through port 133 it permeates the packing and provides a good fluid tight seal about the valve stem. A seal of this type is disclosed in Nordstrom Patent No. 2,204,440. The reduced upper end 154 of stem 124 extends freely through bore 129 up into housing 148.

The mechanism for operating, lubricating and "jacking" the plug will now be described.

As shown in Figures 2 and 11, an operating lever 156 comprising a cylindrical hub 158 and a pair of spaced parallel radial arms 160 and 162 is non-rotatably secured on stem end 154 as by a key 164 engaging mated slots 166 and 168 on the sleeve and stem respectively. A button 170 disposed within the upper end of hub 158 atop stem end 154 is also non-rotatably secured to the hub by key 164 which engages in a suitable slot in the marginal portion of the plug. The top of button 170 is provided with a reduced diameter portion 172 which passes freely through an aperture 174 in a cover plate 176 secured to the top of housing 148 as by a plurality of cap screws 178, aperture 174 being counterbored to accommodate suitable packing 180.

A valve stem position indicator pointer 182 is fastened to the top of button 170 as by cap screw 184, a locating dowel 186 being provided to establish a predetermined orientation of the pointer relative to the valve ball in assembly so that the position of the ball may be determined by observation of the pointer. It is preferred that pointer 182 extends parallel to the axis of passage 62 in the ball when the valve is fully open.

Referring now to Figures 1, 11 and 12, the free ends of radial arms 160 and 162 are slotted as at 188 to receive antifriction rollers 190 journaled on coaxial pivots 191 projecting from the top and bottom of a ball bearing nut 192. Ball bearing nut 192 is mounted for travel along a helically grooved worm shaft 202 that extends through gear housing 148 normal to the axis of rotation of ball 56.

Ball bearing nut 192 encloses three groups of spherical ball bearings 193, the balls of each group travelling in a predetermined helical passage formed by the semicircular cross section helical groove 204 in shaft 202 and the opposed internal helical groove 205 in the nut 192 and a transfer tube connecting the ends of the passage. The three transfer tubes are shown at 194, 195 and 196 in Figure 12 and they are held in position by a clamp 197 and bolts 198 that project upwardly from four arcuate deflector members 199 mounted in spaced relation along the helical passage in such position (Figure 12) as to deflect the balls of each group from the passage into the transfer tube and to deflect balls emerging from the transfer tube back into the passage. Nuts 201 secure these parts together. Thus when shaft 202 is rotated the turning effort is translated substantially without friction into longitudinal movement of nut 192 along the shaft. The ball bearing nut and helical worm shaft assembly is preferably the same as that disclosed in United States Letters Patent No. 2,505,131, issued April 25, 1950, to which reference is made for any further detail needed to understand the invention.

The left end of the shaft 202 (Figure 1) is journaled in the end wall of housing 148 in a suitable anti-friction bearing 206 while the other end is journaled in bearing 207 (see Figure 7). Counterclockwise rotation of shaft 202 as viewed in Figure 11 causes the ball bearing nut 192 to travel along shaft 202 to the left in Figure 1, thereby rotating lever 156 and the valve ball counterclockwise. Stops 208 and 209 (Figures 1 and 7) are fixed on each end of the shaft to limit the travel of the ball bearing nut therealong and hence limit the rotation of the valve ball to 90° between fully open and fully closed positions.

As shown in Figure 7 bearing 207 is mounted in a pump housing 210 secured to the side wall of gear housing 148 through bolts 214 and gasket 216. The right end of shaft 202 extends through bearing 207 and terminates within the pump housing in a coaxial section 212 of reduced diameter. Pump housing 210 contains a through bore 218 of varying diameters and is closed at its outer end by a plate 220 which is secured to housing 210 by cap screws 221.

A bushing 222 in plate 220 journals a rotatable stub shaft 224 that passes through plate 220 in coaxial alignment with worm shaft 202, the inner end of shaft 224 containing a suitably bushed concentric socket 226 adapted to snugly but freely rotatably receive and pilot tenon 212 of shaft 202. The outer end of shaft 224 is provided with operating means such as hand wheel 227, and a suitable rubber O-ring seal assembly 229 seals shaft 224 with the housing.

Within pump housing 210, a substantially cylindrical fixed clutch element 228 is non-rotatably mounted on the end of shaft 202, as by key 230 engaging in slots 232 and 234 on the interior surface of the clutch element and exterior surface of the shaft, respectively. A set screw 236 locks clutch element 228 against sliding on shaft 202 and in abutment with the inner race of bearing 207 fixed on shaft 202.

A second and similar clutch element 238 is non-rotatably but axially slidably mounted on the adjacent end of stub shaft 224 as by a key 240 disposed in radially aligned keyways 242 and 244 on the shaft and clutch member respectively. The adjacent ends of the clutch elements are formed with a plurality of annularly arranged teeth 246 and 247 which are shown in normally meshed position in Figure 7. The clutch element teeth are further shown in Figures 14 and 15 and, in developed view, in Figures 16 and 17, wherein it will be seen that one of the clutch elements, for example, 228 has a plurality of teeth 250, 252, 254, 256 of gradually increasing thicknesses each having a similar adjacent tooth space 251, 253, 255, 257 respectively. Preferably the flanks or faces 258 of the teeth each make an angle of approximately 30° with the vertical, the top and bottom lands 259 and 260, respectively, are flat and parallel and normal to the shaft axis, and all engaging surfaces are finished.

Slidable clutch element 238 carries a complementary set of spaces 250', 252', 254', 256', and teeth 251', 253', 255', 257', shaped, arranged and adapted to mesh with the corresponding teeth and spaces, respectively, of clutch element 228 in one relative angular position as demonstrated in Figure 16. Figure 17 shows the clutch elements in a relatively angularly displaced position wherein the corresponding teeth and spaces are not registered, the teeth being so constructed and arranged that registration and mesh can occur only in one relative angular position of these clutch elements.

Referring again to Figure 7, a cam 262 is non-rotatably but axially slidably mounted on stub shaft 224 adjacent slidable clutch element 238 by an internal keyway and key 240. Cam 262 is formed with an annular peripherally continuous working surface 264 of axially varying lift, the lift of the cam being greater at 266 than at 268. A spring 270, compressed between plate 220 and the cam, biases the cam to the left in Figure 7 into abutting sliding surface contact with clutch element 238, which, in turn is similarly urged thereby to the left against the fixed clutch element 228 and, if the clutch teeth are properly positioned, into mesh therewith. A snap ring 272 or similar stop device is provided on the stub shaft 224 and is so located as to permit clutch element 238 to move leftward a sufficient amount to completely mesh the clutch teeth but preventing the spring 270 from forcing the cam and clutch element off the end of the shaft during assembly or disassembly of the unit. The snap ring 272 also serves to disengage the clutch elements when such disengagement is sought to be accomplished manually by pulling shaft 224 axially outwardly (to the right in Figure 7) of the pump housing 210 for a purpose which will hereinafter be explained.

As shown in Figures 7-10, pump housing 210 embodies a lubricant pump comprising a pair of pump pistons 274 and 276 slidably disposed in cylindrical bores 278 and 280, respectively, which bores are diametrically oppositely disposed relative to the axis of rotation of the cam and serve as pumping chambers.

The outer end of each bore 278 and 280 is enlarged and threaded to receive check valve assemblies indicated generally at 282 and 284. Inasmuch as they are identical, only the assembly 284 will be described in detail with corresponding reference numerals bearing prime marks applied to assembly 282 to indicate corresponding elements. Valve assembly 284 includes a substantially cylindrical body member or cage 286 threadedly secured into the outer end of bore 280 and containing an internal bore 288 that is reduced at 290 to provide an annular seat 292. The outer end of the bore 288 is closed by a cap member 294 apertured and threaded to accommodate a fitting 296 which connects conduit 105 to cage 286 in fluid communication with the bore. A compression spring 298, abuts cap 294 to resiliently bias a check valve element 300 into sealing relation on seat 292 thereby permitting only unidirectional flow of lubricant in conduit 105 in the direction of the arrow in Figure 1.

Check valve assembly 282 is identical to 286, as has already been mentioned, and discharges, i.e., permits unidirectional flow from bore 278 into and through conduit 104 only in the direction of the arrow in Figure 1. As will be seen from Figure 1, conduits 104 and 105 conduct lubricant from the pump cylinders to the valve seat rings in the valve housing and tail piece, respectively, via the system hereinbefore described.

Referring again to Figure 7, a pair of compression springs 302 and 303 disposed in bores 280 and 278, respectively, resiliently urge pistons 276 and 274, axially of their respective bores and into operative engagement with cam surface 264 at all times, the cam contacting ends 304 and 305 of the respective pistons being substantially hemispherical so as to provide substantial point contact and minimum frictional resistance to the rotation and axial displacement of the cam.

A lubricant reservoir of large volume indicated generally at 306 (Figure 7), and formed preferably as an integral part of the gear housing 148, comprises an open ended chamber 308 having a cylindrical side wall 310 (see Figure 10). The bottom wall 312 of this chamber contains a short blind bore 314 intersecting a passage 316 which extends to the mating surfaces of gear housing 148 and pump housing 210 where it registers with a coaxial passage 318 in the latter to form a supply conduit for conducting lubricant from reservoir chamber 308 to the pump as will hereinafter appear. The outer end of conduit 318 is closed by threaded plug 319. The open end of chamber 308 is closed by a cap 320 secured to the housing as by bolts 322 (Figure 1) and having an annular locating extension 324 which projects through cover plate 176 and is received in the chamber and provided with a packing ring 326 to establish a fluid tight seal.

A circular piston or plunger 328, grooved to carry a peripheral packing such as rubber O-ring 330, is slidably disposed within chamber 308 and is biased toward the bottom 312 of the reservoir as, for example, by air or other fluid pressure supplied to the upper surface of the piston through line 331 connected to threaded port fitting 332 in cap 320. Thus the lubricant within the reservoir chamber 310 may be kept under any desired pressure tending to force it through conduits 314, 316, 318 toward the pump.

Adjacent its end remote from the reservoir, passage 318 opens into bores 334 and 336. As illustrated in Figures 7 and 8, bore 334 extends across the entire width of the pump housing and its ends are closed by threaded plugs 335 and 337. Bore 336 has an enlarged upper portion 340 providing an annular shoulder 344 concentric with bore 336, which shoulder provides a seat for a check valve element 346 biased thereagainst by a compression spring 348 reacting against a bore closure plug 350. A blind bore 352 (Figure 10) connects the enlarged passage portion 340 with the adjacent cylinder bore 278 at a point sufficiently behind piston 274 that the piston will not obstruct bore 352 in its normal operating stroke. Bore 352 is closed at its outer end by threaded plug 353.

A small by-pass conduit 354 connects chamber 278 with passage 318, a needle valve 356 being provided to adjust the rate of by-pass flow. The needle valve 356 is threadedly rotatably mounted in the pump housing and carries a kerf 358 on its outer end whereby adjustment thereof may be conveniently effected. A jam nut 360 and a cap nut 362 threaded on the outer end of the needle, respectively, to lock the needle in adjusted position, and enclose the end of the needle suitable sealing rings 363 being interposed between the jam nut and the pump housing and between the cap nut and the jam nut to prevent leakage of fluid.

Referring to Figure 8, the end of bore 334 opposite its connection to passage 318 is intersected by a vertical bore 363 parallel to bore 336 and having an enlarged upper section 364 providing a seat for a check valve element 365 biased thereagainst by a compression spring 366 reacting against closure plug 367 threaded in the outer end of bore section 364. Bore section 364 is intersected by a blind bore 368 closed at its outer end by threaded plug 369 and leading to pumping chamber 280. A small by-pass conduit 371 extends from bore 368 and has an enlarged section 372 providing a seat for a needle valve element 373 rotatably threaded in section 372 and locked by a jam nut 374 and cap 375 and sealed by packing rings 377 in the manner of needle element 356. Bore section 372 is larger in diameter than the shank of needle element 373 and is connected with passage 334 by a duct 376 as illustrated in Figures 8 and 10.

Figure 18 discloses an optional conduit arrangement for introducing the lubricant into each floating seat ring 58 or 60. The parts correspondingly numbered are the same as in Figure 4, and the bore 90 contains a hollow tube 400 of resilient material such as rubber that has part of its length snugly lining bore 90 and the rest of its length projecting into an enlarged counterbore 401 that communicates with duct 86 of seat ring 60 and is of the same size as bore 90.

The upper end of rubber tube 400 is beveled and crowned toward its periphery when relaxed but when pushed into position against flat radial shoulder 402 in the bottom of the counterbore the inwardly projecting annular lip 403 is deformed to tightly seal with the shoulder. Similarly abutment of spacer 106 against the similarly crowned lower end of tube 400 deforms lip 404 to seal therewith so that a continuous sealed passage is provided between the housing and the seat ring, which passage is not hampered by longitudinal float of the seat ring because the rubber tube is laterally flexible and merely bends slightly with shift of the ring. In practice we prefer to surround the tube 400 with a medial band of tough fabric or the like 405 where it bridges bore 90 and counterbore 401 to resist cutting of the rubber by the shifting seat ring edges.

We have also found that lubricant pressure within the tube 400 acts to urge lips 403 and 404 more tightly into sealing engagement with the shoulder 402 and the fixed end of spacer 106 respectively so that there is no loss of lubricant here.

Operation

Assuming, for example, that the direction of fluid flow through the valve is as indicated by the arrow in passage 62' in Figure 2, and the valve is closed or rotated 90° from the Figure 2 position, the full line pressure bears on the plug and urges it against the downstream seat ring 58, which, being resiliently backed is displaced slightly from the upstream ring 60. The line pressure also acts on the upstream ring and urges it into sealing contact with upstream face of the plug. Thus, the axially slidable upstream seat follows the plug and provides a double peripheral seal regardless of the direction of flow.

The lubricant supply arrangements shown in Figures 4 and 18 permit this axial floating displacement of the seat rings without disruption of the lubricant supply.

Lubricant is supplied from the reservoir 308 to the grooves 76 at all times via conduits 104 and 105 in the following manner. The lubricant in the reservoir is always maintained under a suitable pressure by piston 328 which is forced against the fluid by compressed air. Sufficient air pressure is maintained on the piston to normally force the lubricant through ducts 314, 318, and 336, and past check valve 346 into pumping chamber 278, and thence past check valve 300' into line 104 which leads to the seat ring grooves. Similarly lubricant is normally forced through ducts 314, 318, 334 and 363, past check valve 365 into pumping chamber 280, and thence past check valve 300 into line 105. The lubricant pressure is enough to normally keep these check valves cracked open against their backing springs.

In the event that it is desired to rotate the ball 56, for example, from closed position to the open position shown in Figure 2, the stub shaft 224 is rotated in a counterclockwise direction by means of hand wheel 227. By virtue of the drive connection effected by the normally engaged clutch elements 228 and 238, worm shaft 202 is similarly rotated and, consequently, the ball bearing nut 192 travels along the longitudinal axis of shaft 202, exerting torque on the valve stem 124 through rollers 190 and the radial lever 156.

The cam 262, non-rotatable with respect to the stub shaft 224, is also rotated thereby imparting opposite reciprocatory motions to pistons 274 and 276. On the recovery or intake stroke, piston 276 draws lubricant from the reservoir through ducts 314, 316, 318, 334 and 363 through the check valve 365 and bore 368 into cylinder bore 280. On the pumping stroke, piston 276 forces the lubricant out of the cylinder through check valve 300 into line 105, check valve 365 closing on this stroke to preclude flow back to the reservoir. Piston 274 functions in the same manner on alternate strokes to pump lubricant into line 104. As already stated, the above-described normal operation takes places with the clutch elements in the normally engaged position, as shown in Figure 7, but inasmuch as the cam 262 is biased against the clutch element 238 so that the low-lift portion 268 on the active cam surface 264 operates the pistons 274 and 276, the stroke of the pistons is short and consequently no appreciable delivery of lubricant ensues.

In the event that the plug should be stuck or frozen to its seat rings, the turning effort required and the torque in shafts 202 and 224 would increase. Under such conditions, the inclined camming surfaces of the clutch elements would overcome the force of spring 270 and ride up on each other, thereby separating the clutch elements 228 and 238, disengaging their teeth and also moving cam 262 to the right in Figure 7, so that high lift portion 266 comes into operative engagement with the follower ends 304 and 305 of the pistons. As explained in conjunction with the description of the clutch teeth, once disengaged, the teeth will not register until at least one entire revolution is completed. Thus, the top lands of the teeth will ride over each other, with stub shaft 224 disconnected from shaft 202 and free to make at least one complete revolution with the cam 262 in its high-lift position. This increases the stroke of pistons 274 and 276 thereby increasing lubricant pressure output of the pump sufficiently to jack the ball valve from its seats. The jacking process is automatically repeated, one shaft revolution at a time until the valve is freed sufficiently to reduce the torque required to turn it. As soon as the torque required to turn the valve is lowered sufficiently the clutch teeth remesh under the force of spring 270 and rotation of the hand wheel rotates the plug 56. By-pass ducts 354 and 371 serve to return lubricant to the reservoir and prevent the building of dangerously high lubricant pressure during jacking in cases where the valve plug is hopelessly frozen.

The ability of the clutches to disengage when placed under abnormally high torque also serves to prevent jamming of the operating linkage. Thus, for example, if the ball bearing nut were against one of the limit stops and the operator neglected to look at the pointer to see the position of the valve plug, or turned the hand wheel in the wrong direction, the clutches would simply disengage and prevent the ball nut linkage from being jammed.

Instead of depending upon torque resistance to separate the clutch elements 228 and 238, the operator may pull on the hand wheel 227 so as to axially displace shaft 224 sufficiently to locate high point 266 of the cam 262 at the pistons and then rotate the hand wheel to obtain the high pressure lubricant action.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a lubricated valve having a valve body containing a plug rotatable to control fluid flow therethrough, cooperating seating surfaces on said body and plug, lubricating means comprising a reservoir adapted to contain a body of lubricant under pressure, a pump, a passage between the reservoir and pump inlet, a passage between the pump outlet and said seating surfaces, and means for rotating said plug having means for actuating said pump including means for disconnecting the plug rotating means and at the same time increasing the pump outlet pressure whenever and so long as the plug turning torque requirements exceed a certain value.

2. In the valve defined in claim 1, a unidirectional check valve in said passage to the pump inlet whereby lubricant under pump pressure cannot return to said reservoir.

3. A pressure lubricated valve assembly comprising a valve body having seats therein, a valve plug rotatably mounted on said seats, lubricant grooves in the surfaces between said plug and said seats, conduits communicating with said grooves and extending through said body, means for turning said plug, pump means for supplying lubricant under pressure to said conduits, means actuated by said plug turning means for actuating said pump means, and a clutch in said plug turning means responsive to the amount of torque required to turn said plug for disconnecting said plug from said plug turning means and for increasing the lubricant pressure output of said pump means when the torque required to turn the plug is greater than a predetermined magnitude and for maintaining said plug disconnected and the lubricant output pressure increased until the plug turning torque requirement is reduced.

4. A pressure lubricated valve assembly comprising a valve body having seats therein, a valve plug rotatably mounted on said seats, lubricant grooves in the surfaces between said plug and said seats, conduits communicating with said grooves and extending through said body, means for supplying lubricant under pressure to said conduits, variable pump means operable to increase the pressure of the lubricant, means including a rotary shaft for turning said plug, a second shaft mounted in axial alignment with said one shaft and drive connected to said pump means, a clutch element non-rotatably mounted on said one shaft, an axially slidable clutch element non-rotatably mounted on said second shaft adjacent said one clutch element, cam means for varying the volumetric capacity of said pump means non-rotatably and axially slidably mounted on said second shaft in abutting relation to said slidable clutch element, resilient means normally biasing said cam means toward and said slidable clutch element into operative engagement with said one clutch element, and interengaging means on the adjacent ends of said clutch elements adapted to overcome said biasing means and axially displace said slidable clutch element away from and out of engagement with said one clutch element when a predetermined resistance to turning is encountered in said plug and to actuate said cam means to increase the volumetric capacity of said pump so long as said clutch elements are disengaged.

5. A pressure lubricated valve assembly comprising a valve body having seats therein, a valve plug rotatably mounted on said seats, lubricant grooves in the surfaces between said plug and said seats, lubricant conduits communicating with said grooves and extending through said body, means including a rotary shaft for turning said plug, means adapted to supply lubricant under pressure to said conduits, a variable capacity pump selectively operable to increase the lubricant pressure in said conduits, said pump including a second rotary shaft disposed in coaxial alignment with said one shaft and a pump operating cam mounted on said second shaft for axial displacement therealong to vary the stroke of said pump, a clutch element non-rotatably secured to said one shaft, an axially slidable clutch element non-rotatably mounted on said second shaft between said one clutch element and said cam, resilient means biasing said cam and slidable clutch element toward said one clutch element, and interengaging teeth on the opposed ends of said clutch elements for drivingly connecting said shafts, said teeth being so constructed and arranged as to disengage and to displace said second clutch element and said cam away from said first clutch element when a predetermined resistance to turning of said plug is encountered, and means on the cam effective in said displaced position of the cam to actuate the pump to increase the output lubricant pressure of said pump.

References Cited in the file of this patent

UNITED STATES PATENTS

| Re. 19,445 | Chandler | Feb. 5, 1935 |
| 1,874,405 | Wood | Aug. 30, 1932 |
| 1,946,236 | Riley | Feb. 6, 1934 |
| 2,030,458 | McKellar | Feb. 11, 1936 |
| 2,051,278 | Svenson | Aug. 18, 1936 |
| 2,055,449 | Beckwith | Sept. 22, 1936 |
| 2,086,725 | McCausland | July 13, 1937 |
| 2,323,421 | Reed | July 6, 1943 |
| 2,333,424 | Humphreys | Nov. 2, 1943 |
| 2,373,628 | Gleeson | Apr. 10, 1945 |
| 2,505,131 | Means | Apr. 25, 1950 |
| 2,520,288 | Shand | Aug. 29, 1950 |
| 2,521,127 | Price | Sept. 5, 1950 |
| 2,525,951 | Sanborn | Oct. 17, 1950 |
| 2,573,177 | Bohlen | Oct. 30, 1951 |
| 2,608,377 | Streun | Aug. 26, 1952 |
| 2,663,290 | Walder | Dec. 22, 1953 |
| 2,663,538 | Bacchi | Dec. 22, 1953 |
| 2,711,229 | Thorne | June 21, 1955 |
| 2,738,684 | Shafer | Mar. 20, 1956 |
| 2,777,664 | Bryant | Jan. 15, 1957 |
| 2,788,015 | Scherer | Apr. 9, 1957 |

FOREIGN PATENTS

| 711,636 | Great Britain | July 7, 1954 |